Patented Jan. 2, 1951

2,536,061

UNITED STATES PATENT OFFICE 2,536,061

ARTIFICIAL JADE AND PROCESS OF MAKING SAME

Harry J. Kahn, Matawan, N. J.

No Drawing. Application July 21, 1949,
Serial No. 106,101

10 Claims. (Cl. 106—42)

This invention relates to artificial jades and the process of making these stones synthetically to yield products having practically all of the valuable properties of the various jades occurring naturally, including the most prized variety, namely, Imperial jade.

Prior efforts to produce synthetic stones to simulate the natural varieties have been unsatisfactory because the resulting products possessed one or more characteristics that differed from natural jade, so that they were readily recognized as imitations. For example, these synthetic stones were either too glossy, too transparent or too soft and, when not lacking in one or more of these respects, the synthetic simulations failed in one or more of the requirements of natural jade as to specific gravity, hardness, color, translucency, waxy feel, crystalline structure, resonance, grain, and cutting and grinding qualities.

Among the objects of this invention is the production of artificial jades that are free from the objectionable deficiencies incident to prior simulations of the natural varieties, as set forth above, and that bear such close and perfected resemblance to the natural stones that recognition of the artificial from the natural stones or minerals is most difficult if not impossible by the most expert in the art, without chemical analysis.

A further object of this invention is the provision of a process of making these perfected artificial jades that may be practiced efficiently, reliably and in a fairly inexpensive manner, and which admits production of a wide variety of jades differing as to color, grain, opacity and other characteristic qualities.

Other, further and more specific objects of this invention will become readily apparent to persons skilled in the art from a consideration of the following description:

The materials employed for the manufacture of my novel products are as follows:

(1) $Pb_2O$, $PbO$, $Pb_2O_3$, $PbO_2$, $Pb_3O_4$ or the carbonates or any compound of lead which calcines to lead oxide. These serve as a flux and constitute 30 to 60 percent of the ingredients.

(2) Feldspar, potassium spar, sodium spar, Cornwall stone or any other materials with rational analysis approximating $K_2O.Al_2O_3.6SiO_2$. These also serve as a flux and form 10 to 30 percent of the ingredients.

(3) Kaolin or any primary or secondary clay of general rational analysis of $Al_2O_3.2SiO_2.2H_2O$. These are used in amount of 2 to 15 percent of the ingredients.

(4) Flint or any form of $SiO_2$, such as sand, quartz, etc. These are used in amount of 5 to 20 percent of the ingredients. Mica may be substituted in whole or in part for the $SiO_2$.

(5) ZnO or hydrated form of zinc oxide or $ZnCO_3$. These serve as opacifying and crystallizing agents and partly as fluxes and constitute from 10 to 20 percent of the ingredients.

(6) Nepheline syenite, of rational analysis $K_2O.3Na_2O.4Al_2O_3.9SiO_2$. This imparts certain refractive and crystalline properties characteristic of the natural jades, and forms 5 to 25 percent of the ingredients.

(7) CuO or copper in the form of other oxide or carbonate and constituting .1 to .5 percent of the ingredients. Other materials suitable for imparting green color or shades to the jade are $Cr_2O_3$ or a combination of the oxide or carbonate of cobalt with the oxide of antimony or iron or sodium uranate.

(8) For yellow jade, $Sb_2O_3$ in the amount of .5 to 5. per cent of the ingredients may be added.

(9) Brown jades may be produced by the addition of 1 to 5 percent of rutile, oxides or chromate of iron or combinations of both.

(10) Black jades may be obtained by the addition of small percentages of the following materials in various combinations: oxides of iron, manganese, cobalt, copper or chromates.

(11) Sapphire colors may be had with the addition of .1 to 1. percent of cobalt oxide or carbonates.

(12) Incomplete mixing of any two or more of the above listed coloring agents will produce a jade with striated shades and colors.

(13) Without the addition of any of the above listed coloring agents, a white jade is formed. Rutile may be added to darken the colors. It also aids crystallization.

The following specific examples are illustrative of the quantities of materials for suitable formulae.

Example I

| | Per cent |
|---|---|
| PbO | 45–50 |
| Flint | 8–10 |
| Potash spar | 12–20 |
| Primary kaolin | 2–5 |
| ZnO | 12–15 |
| Nepheline syenite | 10–15 |
| CuO | 0.2–0.5 |

This formula may be used for making a green jade to simulate Imperial jade.

Example II

By adding 1 to 2% of rutile to the formula in Example I, a dark green jade is obtained.

Example III

|  | Per cent |
|---|---|
| Basic lead carbonate | 50–55 |
| Potash spar | 12–15 |
| Flint | 8–10 |
| Primary kaolin | 2–4 |
| ZnO | 15–18 |
| Nepheline syenite | 5–10 |
| $Cr_2O_3$ | 0.2–0.5 |

This formula may also be used for making green jade to simulate Imperial jade.

Example IV

A deep yellow jade is formed by substituting 2 to 4% of antimony oxide for the $Cr_2O_3$ in Example III.

Example V

Blue jade is formed by substituting 0.2 to 2% of cobalt oxide for the $Cr_2O_3$ in Example III.

Example VI

|  | Per cent |
|---|---|
| Lead oxide | 35–40 |
| Feldspar | 10–12 |
| Sand | 10–12 |
| Clay | 2–6 |
| ZnO | 14–16 |
| Nepheline syenite | 20–25 |
| Ferric oxide | 3–5 |

This formula will produce a brown jade.

Example VII

By adding 0.2–0.5% CuO, 1.5–2.5% rutile and 0.2–0.5% $MnCO_3$ or $MnO_2$ to the formula in Example VI, a black jade is obtained.

Example VIII

|  | Per cent |
|---|---|
| Lead oxide | 40–45 |
| Feldspar | 18–20 |
| Quartz or mica | 6–8 |
| Kaolin | 3–5 |
| Zinc carbonate | 15–18 |
| Nepheline syenite | 10–15 |
| CuO | 0.2–0.5 |
| Ferric oxide | 0.2–0.5 |

This formula will yield jade of spinach green color.

By omitting the CuO from Example I, the $Cr_2O_3$ from Example III, the $Fe_2O_3$ from Example VI and the CuO and $Fe_2O_3$ from Example VIII, without adding any other coloring material, white jades will result.

All of the percentages are by weight.

The raw materials are thoroughly mixed and ground (either wet or dry) to a fine powder in a pebble mill or other suitable grinding mill well known to the art, then calcined at red heat of 1200° to 1600° F. to drive off water, organic matter, carbonates and volatile oxides, such as those of copper, lead and zinc. This preliminary calcination step is preferable, but may be dispensed with where economy of operation is of greater importance than the select quality of the product. The next step is to heat the finely ground material (preliminarily calcined or not) in a mold or crucible at 2100° to 2400° F. for 3 to 5 hours. The resulting material may be reheated, preferably at slightly lower temperature, e. g. 1900° to 2100° F. with beneficial effect on the resulting jade. The cooled jade may then be polished and/or carved.

Reheating to the lower temperature causes separation of some of the ingredients due to supersaturation of the flux mixture and leaves a translucent mass with some semi-opaque undissolved silicates dispersed throughout.

The jades made according to the above process resemble the natural jades so closely in specific gravity, hardness, color, translucency, waxy feel, crystalline structure, resonance, grain, cutting and grinding properties as to defy detection or differentiation from the natural jades, even by those of extraordinary high skill and ability, save by chemical analysis.

My synthetic jades may readily be used in place of the natural jades, without suffering in comparison, for articles of jewelry, objects of art, figurines, vases, ash-trays, lamp bases and other ornamental and decorative supports, jewels and other bearings, bushings and for abrasives in the various forms employed for grinding, polishing and cutting. These artificial jades have a specific gravity of 3.2 to 3.8, hardness of 6 to 7, a soapy, waxy feel, resound with clear resonance when struck and, depending on the coloring materials employed, match the natural green, brown, yellow, black and white varieties of jade of the lighter, medium and darker shades.

In the claims, the expression "a lead compound that calcines to PbO" is intended to include PbO, per se, as well as other lead compounds that calcine to PbO; likewise, the expression "a zinc compound that calcines to ZnO" is intended to include ZnO, per se, as well as other zinc compounds that calcine to ZnO.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. A synthetic jade composition comprising the oxides of Si, Al, Pb, Zn, K and Na, wherein the oxide of Si is 26 to 33%, the oxide of Al is 6 to 9%, the oxide of Pb is 36 to 47%, the oxide of Zn is 12 to 16%, and the oxides of alkali metals are 4.3 to 6.8%.

2. A synthetic jade composition comprising the oxides of Si, Al, Pb, Zn, K and Na, wherein the oxide of Si is 26 to 33%, the oxide of Al is 6 to 9%, the oxide of Pb is 36 to 47%, the oxide of Zn is 12 to 16%, the oxide of K is 3 to 4.5% and the oxide of Na is 1.3 to 2.3%.

3. A synthetic jade composition having a specific gravity of 3.2 to 3.8, a hardness of 6 to 7 and a soapy, waxy feel, and comprising the oxides of Si, Al, Pb, Zn, K and Na, wherein the oxide of Si is 26 to 33%, the oxide of Al is 6 to 9%, the oxide of Pb is 36 to 47%, the oxide of Zn is 12 to 16%, and the oxides of alkali metals are 4.3 to 6.8%.

4. A synthetic jade composition comprising the oxides of Si, Al, Pb, Zn, K and Na, wherein the oxide of Si is 26 to 33%, the oxide of Al is 6 to 9%, the oxide of Pb is 36 to 47%, the oxide of Zn is 12 to 16%, and the oxides of alkali metals are 4.3 to 6.8%, and 0.1 to 10.0% of coloring material selected from the group consisting of the oxides of Cu, Cr, Sb, Co, Ti, Fe and Mn and sodium uranate.

5. A synthetic jade composition having a specific gravity of 3.2 to 3.8, a hardness of 6 to 7, a soapy, waxy feel and a translucent body with semi-opaque undissolved silicates dispersed therethrough, and comprising the oxides of Si, Al, Pb, Zn, K and Na, wherein the oxide of Si is 26 to 33%, the oxide of Al is 6 to 9%, the oxide of Pb is 36 to 47%, the oxide of Zn is 12 to 16%, and the oxides of alkali metals are 4.3 to 6.8%, and 0.1 to 10.0% of coloring material selected from the group consisting of the oxides of Cu, Cr, Sb, Co, Ti, Fe and Mn and sodium uranate.

6. In a process of making synthetic jade, calcining at 1200–1600° F. a mixture of finely ground substances comprising 30 to 60% of a lead compound that calcines to PbO, 10 to 30% of material with rational analysis of substantially $$K_2O \cdot Al_2O_3 \cdot 6SiO_2$$

2 to 15% of material with rational analysis of substantially $Al_2O_3 \cdot 2SiO_2 \cdot 2H_2O$, 5 to 20% of $SiO_2$, 10 to 20% of a zinc compound that calcines to ZnO, 5 to 25% of nepheline syenite and 0.1 to 10% of coloring material selected from the group consisting of the oxides of Cu, Cr, Sb, Co, Ti, Fe and Mn, the carbonates of Cu, Co and Mn and sodium uranate to expel volatile matter, then heating the products of said preliminary calcination at 2100 to 2400° F. for 3 to 5 hours, and then reheating at reduced temperature of 1900 to 2100° F.

7. In a process of making synthetic jade, calcining at 1200–1600° F. a mixture of finely ground substances comprising 30 to 60% of a lead compound that calcines to PbO, 10 to 30% of material with rational analysis of substantially $$K_2O \cdot Al_2O_3 \cdot 6SiO_2$$

2 to 15% of material with rational analysis of substantially $Al_2O_3 \cdot 2SiO_2 \cdot 2H_2O$, 5 to 20% of $SiO_2$, 10 to 20% of a zinc compound that calcines to ZnO, 5 to 25% of nepheline syenite and 0.1 to 10% of coloring material selected from the group consisting of the oxides of Cu, Cr, Sb, Co, Ti, Fe and Mn, the carbonates of Cu, Co and Mn and sodium uranate to expel volatile matter, then heating the products of said preliminary calcination at 2100 to 2400° F. for 3 to 5 hours.

8. In a process of making synthetic jade, calcining at 2100 to 2400° F. for 3 to 5 hours a mixture of finely ground substances comprising 30 to 60% of a lead compound that calcines to PbO, 10 to 30% of material with rational analysis of substantially $K_2O \cdot Al_2O_3 \cdot 6SiO_2$, 2 to 15% of material with rational analysis of substantially $$Al_2O_3 \cdot 2SiO_2 \cdot 2H_2O$$

5 to 20% of $SiO_2$, 10 to 20% of a zinc compound that calcines to ZnO, 5 to 25% of nepheline syenite and 0.1 to 10% of coloring material selected from the group consisting of the oxides of Cu, Cr, Sb, Co, Ti, Fe and Mn, the carbonates of Cu, Co and Mn and sodium uranate to expel volatile matter, and then reheating at reduced temperature of 1900 to 2100° F.

9. In a process of making synthetic jade, calcining at 1200–1600° F. a mixture of finely ground substances comprising 30 to 60% of a lead compound that calcines to PbO, 10 to 30% of material with rational analysis of substantially $$K_2O \cdot Al_2O_3 \cdot 6SiO_2$$

2 to 15% of material with rational analysis of substantially $Al_2O_3 \cdot 2SiO_2 \cdot 2H_2O$, 5 to 20% of $SiO_2$, 10 to 20% of a zinc compound that calcines to ZnO and 5 to 25% of nepheline syenite, and then heating the products of said preliminary calcination at 2100 to 2400° F. for 3 to 5 hours.

10. In a process of making synthetic jade, calcining at 2100 to 2400° F. for 3 to 5 hours a mixture of finely ground substances comprising 30 to 60% of a lead compound that calcines to PbO, 10 to 30% of material with rational analysis of substantially $K_2O \cdot Al_2O_3 \cdot 6SiO_2$, 2 to 15% of material with rational analysis of substantially $Al_2O_3 \cdot 2SiO_2 \cdot 2H_2O$, 5 to 20% of $SiO_2$, 10 to 20% of a zinc compound that calcines to ZnO and 5 to 25% of nepheline syenite.

HARRY J. KAHN.

No references cited.